United States Patent
Eastham

(10) Patent No.: US 6,457,015 B1
(45) Date of Patent: Sep. 24, 2002

(54) ADAPTIVE AND GENERALIZED STATUS MONITOR

(75) Inventor: Paul Eastham, Santa Clara, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

(21) Appl. No.: 09/307,089

(22) Filed: May 7, 1999

(51) Int. Cl.$^7$ .............................................. G06F 17/00
(52) U.S. Cl. ..................... 707/102; 707/103; 706/46; 706/45
(58) Field of Search .................... 706/46, 47, 14, 706/48, 12; 702/102, 185, 61, 84, 81, 181, 183, 186; 379/202; 714/25, 26; 709/224, 236, 204; 707/101–102; 345/501; 340/573; 705/8; 713/600; 382/209, 182; 700/17, 83, 29

(56) References Cited

U.S. PATENT DOCUMENTS

| | | | |
|---|---|---|---|
| 5,261,051 A | | 11/1993 | Masden et al. |
| 5,627,766 A | * | 5/1997 | Beaven ........................ 702/122 |
| 5,633,999 A | * | 5/1997 | Clowes et al. ................. 714/16 |
| 5,664,107 A | * | 9/1997 | Chatwani et al. ........... 709/224 |
| 5,729,685 A | * | 3/1998 | Chatwani et al. ........... 709/224 |

(List continued on next page.)

FOREIGN PATENT DOCUMENTS

| | | | | |
|---|---|---|---|---|
| EP | 0306244 A2 | 3/1989 | ........... | G06F/11/00 |
| EP | 0308056 A2 | 3/1989 | ........... | G06F/15/16 |
| EP | 0410630 A | 1/1991 | ........... | G06F/11/14 |
| EP | 0566967 A | 10/1993 | ........... | G06F/11/14 |
| EP | 0760503 A1 | 3/1997 | ........... | G06F/11/14 |

OTHER PUBLICATIONS

Wybranietz et al., "Joint international conference on measurement and modeling of computer system", 1998, pp. 197–206.*

Borr A J: "SecureShare: safe Unix/Windows file sharing through multiprotocol locking" Proceeding of the 2nd Usenix Windows NT Symposiom, proceedings of 2nd Usenix Windows NT Symposiom, Seattle, WA, USA, Aug., 3–5, 1998, pp. 117–126, XP002097387 ISBN 1–880446–95–2, 1998, Berkeley, CA, USA, Usenix Assoc. USA.

(List continued on next page.)

Primary Examiner—John Breene
Assistant Examiner—Mohammad Ali
(74) Attorney, Agent, or Firm—Swernofsky Law Group PC

(57) ABSTRACT

The invention provides a method and system for monitoring status in a relatively continuous, consistent, and intelligent manner. A status monitor receives monitoring data, adaptively and dynamically builds a database of known combinations of monitoring data, and adaptively and dynamically associates those known combinations with assessments of the monitored devices, systems, or networks. From an initial set of selected knowledge that is limited (even limited to no knowledge at all), the status monitor learns those anomalous conditions that require response and what responses are appropriate. The status monitor develops a database of information regarding distinguishable conditions, and measurements of the likely causes or effects of recognizable errors or faults. When an anomalous pattern is recognized, the status monitor, responsive to the anomalous pattern, diagnoses and corrects, or informs a human operator regarding, the monitored devices, systems, or network. The monitoring data includes a set of data streams each possibly having a different format, and each selectively interpreted so as to present information to the status monitor in a format usable by the status monitor. New data streams and formats can be dynamically added or altered. Appropriate responses can include informing human beings; taking remedial action for the monitored devices, systems, or networks; or altering or terminating the operation of the monitored devices, systems, or networks.

37 Claims, 3 Drawing Sheets

U.S. PATENT DOCUMENTS

| | | | | | |
|---|---|---|---|---|---|
| 5,787,409 | A | * | 7/1998 | Seiffert et al. | 706/45 |
| 5,958,012 | A | * | 9/1999 | Battat et al. | 709/224 |
| 6,006,227 | A | * | 12/1999 | Freeman et al. | 707/7 |
| 6,054,928 | A | * | 4/2000 | Lemelson et al. | 340/573 |
| 6,067,541 | A | * | 5/2000 | Raju et al. | 707/3 |
| 6,192,354 | B1 | * | 2/2001 | Bigus et al. | 706/46 |
| 6,192,403 | B1 | * | 2/2001 | Jong et al. | 709/224 |
| 6,199,099 | B1 | * | 3/2001 | Gershman et al. | 709/203 |

OTHER PUBLICATIONS

Tanner J:" CIFS: Common Internet File System" Unix Review, vol. 31, Feb. 1997, pp. 31/32, 34, XPOOO783952 see whole document, relevant to claim No. 1–38.

"Mapping the VM text files to the AIX text files", IBM Technical Disclosure Bulletin., vol. 33, No. 2, Jul. 1990, p. 341 XP000123641, IBM CORP. New York., US ISSN: 0018–8689—the whole document.

"Migrated Data Backup Utility", IBM Technical Disclosure Bulletin., vol. 37, No. 06B, Jun. 1994, pp. 505–507, XP000456079, IBM Corp. New York., US ISSN: 0018–8689.

* cited by examiner

ADAPTIVE AND GENERALIZED STATUS MONITOR

BACKGROUND OF THE INVENTION

1. Field of the Invention

The invention relates to status monitors, including those for adaptively monitoring status information from multiple sources such as file servers and system administrators.

2. Related Art

Monitoring devices collect and present monitoring information, such as information regarding operation of a device, system, or network. The monitoring information is sometimes used to determine or respond to faults in the monitored devices, systems, or networks.

One problem in the known art is that of recognizing and responding to anomalous behavior on the part of the monitored devices, systems, or networks. Because the monitored devices, systems, or networks can be complex, it is difficult or impossible to anticipate all, or even most, of the possible ways in which anomalous behavior can occur. Even if it were possible to anticipate anomalous behaviors, it is difficult or impossible to anticipate how those anomalous behaviors would manifest themselves in the available data.

A first known method is to present a visual display of status information, and to rely on a human operator to determine whether the behavior of the monitored devices, systems, or networks are anomalous, and if so, to determine what that anomalous behavior indicates about possible errors or faults in operation. While this method can achieve the purpose of recognizing and responding to anomalous behaviors, it has the drawback of requiring constant and consistent attention of a human being relatively skilled in the operation of the monitored devices, systems, or networks. This drawback is exacerbated when there are a relatively large number of monitored devices, systems or networks or when the monitored devices, systems or networks are complex. Moreover, this known method is also subject to the drawback that it is limited to those aspects of behavior that are predetermined for presentation to the human being.

A second known method is to present information, as in the first method, to an expert system or other software designed for recognizing and responding to anomalous behavior. While this known method has the advantage of not requiring the constant and consistent attention of a human being, it suffers from the drawback that it is limited by the skill predetermined for inclusion in the expert system or other software. As with the first known method, this method is also subject to the drawback that it is limited to those aspects of behavior that are predetermined for presentation (to the expert system). Moreover, this method is also subject to the drawback that it can erroneously determine and respond to anomalous conditions that are not in fact faults, without substantial opportunity to learn.

Accordingly, it would be desirable to provide a method and system for monitoring status in a relatively continuous, consistent, and intelligent manner. This method is achieved in an embodiment of the invention in which a status monitor receives monitoring data, adaptively and dynamically builds a database of known combinations of monitoring data, and adaptively and dynamically associates those known combinations with assessments of the monitored devices, systems, or networks. From an initial set of selected knowledge that is limited (even limited to no knowledge at all), the status monitor can learn those anomalous conditions that require response and what responses are appropriate.

SUMMARY OF THE INVENTION

The invention provides a method and system for monitoring status in a relatively continuous, consistent, and intelligent manner. A status monitor receives monitoring data, adaptively and dynamically builds a database of known combinations of monitoring data, and adaptively and dynamically associates those known combinations with assessments of the monitored devices, systems, or networks. From an initial set of selected knowledge that is limited (even limited to no knowledge at all), the status monitor learns those anomalous conditions that require response and what responses are appropriate. The status monitor develops a database of information regarding distinguishable conditions, and measurements of the likely causes or effects of recognizable errors or faults. When an anomalous pattern is recognized, the status monitor, responsive to the anomalous pattern, diagnoses and corrects, or informs a human operator regarding the monitored devices, systems, or network.

In a preferred embodiment, the monitoring data includes a set of data streams each possibly having a different format, and each selectively interpreted so as to present information to the status monitor in a format usable by the status monitor. New data streams and formats can be dynamically added or altered. Appropriate responses can include informing human beings; taking remedial action for the monitored devices, systems, or networks; or altering or terminating the operation of the monitored devices, systems, or networks.

DETAILED DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose processors (or special purpose processors adapted to the particular process steps and data structures) operating under program control, and that implementation of the preferred process steps and data structures described herein using such equipment would not require undue experimentation or further invention.

System Elements

Figure 1:
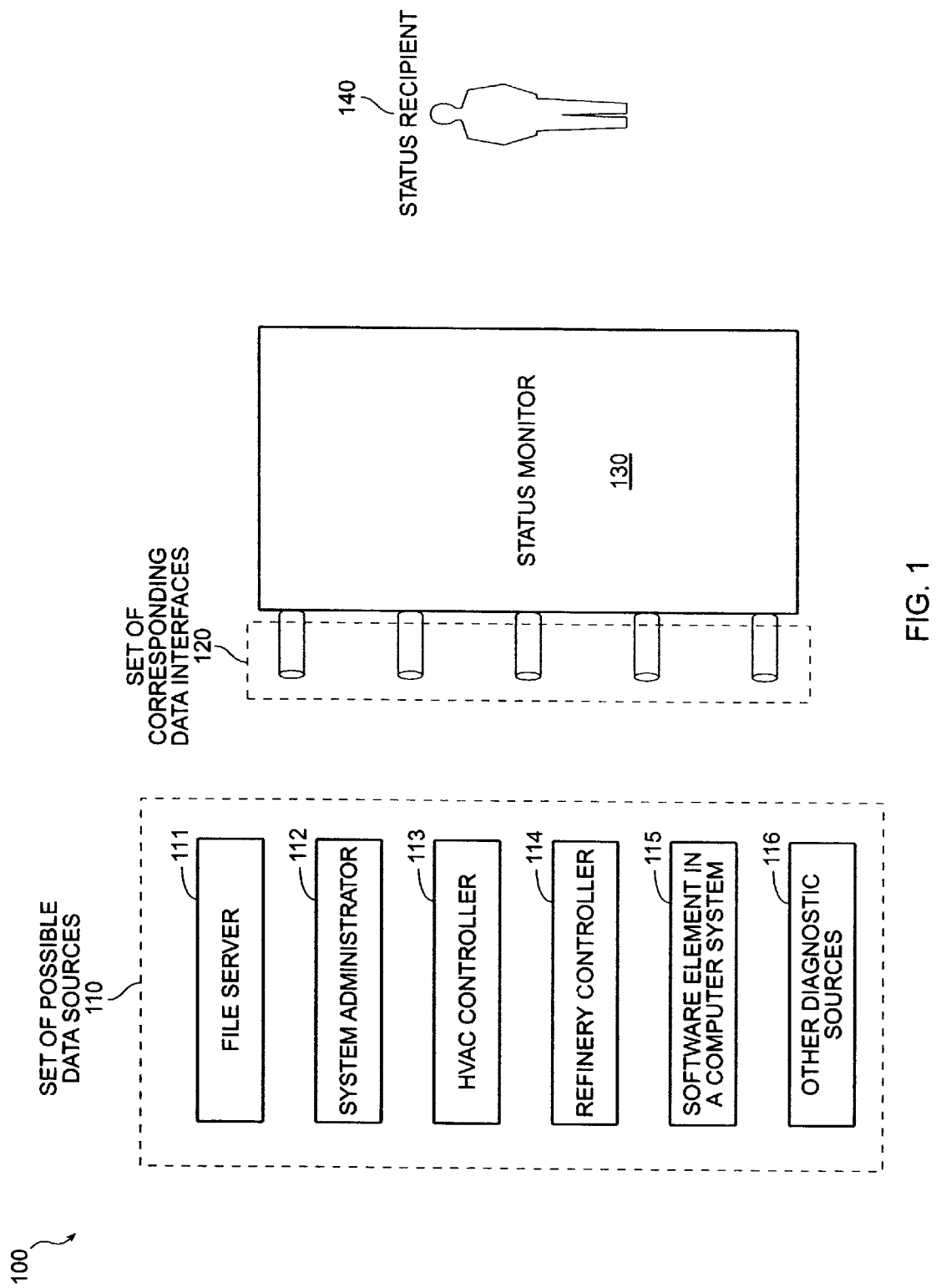
FIG. 1 shows a block diagram of a system including a status monitor for adaptively monitoring status information from multiple sources.

FIG. 1 shows a block diagram of a system including a status monitor for adaptively monitoring status information from multiple sources.

A system 1x00 includes a set of data sources 1x10, a set of corresponding data interfaces 1x20, a status monitor 1x30, and a status recipient 1x40.

The data sources 1x10 can include differing types of data sources 1x10 for which monitoring is appropriate, including a file server 1x11 or other type of server, a system administrator 1x12 or other operator, an HVAC controller 1x13, a refinery controller 1x14, a software element in a computer system 1x15 or other diagnostic sources 1x16. The differing types of data sources 1x10 can generate data in differing formats. For example, the file server 1x11 or other type of server can generate data in SNMP format; the system administrator 1x12 or other operator can generate data using an email program, and the other diagnostic sources 1x16 can generate data in other formats. SNMP format and email formats are known in the art of network communication.

In a preferred embodiment, the data sources 1x10 use a communication network to send information to the data interfaces 1x20. The communication network can include any known apparatus and methods for sending information from the data sources 1x10 to the data interfaces 1x20. Those skilled in the art would recognize, after perusal of this application, that any such apparatus and methods would be within the scope and spirit of the invention. In a preferred embodiment, the communication network includes a LAN (local area network), WAN (wide area network), an internet, intranet, extranet, VPN (virtual private network), or some combination thereof.

The data interfaces 1x20 each correspond to one of the data sources 1x10. Each data interface 1x20 receives data from its corresponding data source 1x10, and forwards that data to the status monitor 1x30 in a format usable by the status monitor 1x30. Additional data interfaces can be added, if desired. In a preferred embodiment, each data interface 1x20 is disposed for recognizing and parsing the format of its corresponding data source 1x10, and for generating messages in a single format usable by the status monitor 1x30. Moreover, data interfaces may completely encapsulate all knowledge of the format and the language of the data source.

The status monitor 1x30 includes a processor, program and data memory, and can include mass storage. Construction and use of devices including processors, program and data memory, and mass storage are known in the art of computer programming.

The status monitor 1x30 need not be a separate physical device. It can be embodied in a software element in a device also used for other purposes, and can be physically co-located with the status recipient 1x40. In a preferred embodiment, software elements of the status monitor 1x30 operate as an application program under control of an operating system on the processor with program and data memory. The application program can include software derived from source code compiled or interpreted from a Perl script or one or more programming languages such as the C++ programming language. Both the Perl scripting language and the C++ programming language are known in the art of computer programming.

The status monitor 1x30 receives messages from the data interfaces 1x20, and is disposed for processing those messages to recognize fault conditions and to determine the nature of the fault with which the fault conditions are correlated.

As used herein, the term "fault" and the phrase "fault condition" refer to conditions of interest to operators of the system 1x10, such as human operators or control programs. There is no particular requirement in the invention that a fault or fault condition refer to an actual error or failure in operation of the system 1x00 or one of its parts.

When recognizing fault conditions and determining the nature of the correlated faults, the status monitor 1x30 sends a message to the status recipient 1x40 indicating the fault conditions and the faults.

The status recipient 1x40 can include an operator of the system 1x10, such as a human operator or a control program, a log file, or a communication link for distributing messages regarding the fault conditions and the faults.

The status recipient 1x40 can include a workstation for use by the operator of the system 1x10, logically remote from the device 1x11, which can be physically relatively local or physically relatively remote. In a preferred embodiment, the system can include more than one such device 1x11 being monitored, and more than one such status recipient 1x40 disposed for receiving monitoring information.

The workstation for the status recipient can include a monitoring and analysis program, including a graphical user interface and a set of commands for analyzing and presenting data.

Status Monitor Elements

Figure 2:
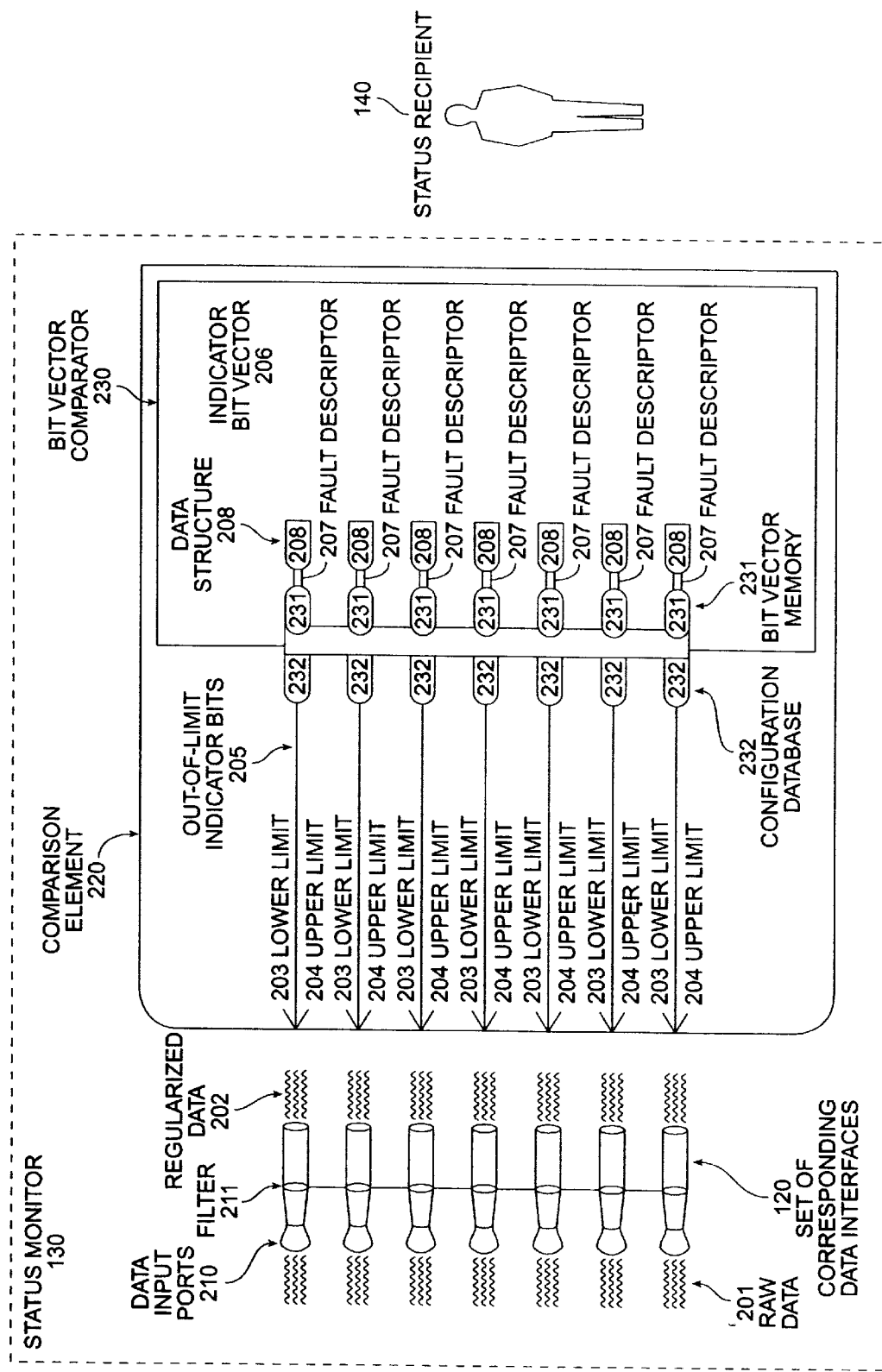
FIG. 2 shows a block diagram of a status monitor for adaptively monitoring status information from multiple sources.

FIG. 2 shows a block diagram of a status monitor for adaptively monitoring status information from multiple sources.

The status monitor 1x30 includes multiple data input ports 2x10, each of which is associated with a corresponding data interface 1x20 and a corresponding filter 211. Each input port 2x10 receives messages indicating values for raw data 2x01 from its corresponding data interface 1x20. Each input port 2x10 processes the raw data 2x01 to provide regularized data 2x02, and sends the regularized data 2x02 to a corresponding comparison element 2x20.

As used herein, the phrase "regularized data" 2x02 refers only to a form of the raw data 2x01 after the input port 2x10 has processed it. There is no particular requirement that the regularized data 2x02 must follow some known distribution, although it is expected that many items of raw data 2x01 will have known random distributions such as a normal, binomial, poisson, or equiprobable distributions.

In a preferred embodiment, the input ports 2x10 may regularize the raw data 2x01 by determining a trend. The input ports 2x10 can determine a trend using any one of a number of known techniques, including for example relative time change in the raw data 2x01. In alternative embodiments, the input ports 2x10 can regularize the raw data 2x01 by determining other statistical measures, such as confidence values or correlation values.

The comparison elements 2x20 each receive the regularized data 2x02, and determine if the received values for the regularized data 2x02 are outside of a selected limit range, designated by a selected lower limit value 2x03 and a selected upper limit value 2x04. Each comparison elements 2x20 provides a corresponding out-of-limit indicator bit 2x05 indicating whether or not the regularized data 2x02 is within the selected limit range.

The indicator bits 2x05 from the comparison elements 2x20 are collected into an indicator bit vector 2x06. The indicator bit vector 2x06 is coupled to a bit vector comparator 2x30.

The bit vector comparator 2x30 includes a bit vector memory 2x31, which itself includes a set of selected bit vectors 2x06, each associated with a fault descriptor 2x07. The fault descriptor 2x07 indicates information about a fault associated with its corresponding bit vector 2x06.

In a preferred embodiment, the number of bit vectors 2x06 in the bit vector memory 2x31 can be selected by a system administrator 1x12 or other operator, and is preferably at least about 32.

In a preferred embodiment, the fault descriptor 2x07 includes a pointer to a data structure 2x08 that includes further information about the fault. This further information can include one or more of, or some combination of, the following:

an assessment of the fault, such as a numeric degree of seriousness;

a description of the fault, such as a title or text description; or a set of actions to be taken in response to the fault, such as a set of individuals to inform about the fault (whether by email, pager, or other technique), a set of functions for the system $1x00$ that should be suspended in response to the fault, or other appropriate actions.

The bit vector comparator $2x30$ receives the indicator bit vector $2x06$ and compares it against the selected bit vectors $2x06$ in the bit vector memory $2x31$. The bit vector comparator $2x30$ selects one or more matching selected bit vectors $2x06$ and provides, in response to associated fault descriptors $2x07$, one or more outputs.

In a preferred embodiment, the bit vector comparator $2x30$ selects the "best match" among the selected bit vectors $2x06$ in the bit vector memory $2x31$ for the indicator bit vector $2x06$, and provides one output in response to the corresponding fault descriptor $2x07$. The bit vector comparator $2x30$ sends the indicator bit vector $2x06$ and the corresponding fault descriptor $2x07$ to the status recipient $1x40$, and takes other appropriate action as indicated by the fault descriptor $2x07$.

In a preferred embodiment, at least one (and possibly several) of the selected bit vectors $2x06$ in the bit vector memory $2x31$ has an associated fault descriptor $2x07$ that describes a "normal" or non-fault condition. Thus, the bit vector comparator $2x30$ can select, in response to the input bit vector $2x06$, an associated "normal" fault descriptor $2x07$. Thus, some anomalous bit vectors $2x06$ can be associated with known lack of error.

In a preferred embodiment, the "normal" fault descriptor $2x07$ can be selected to indicate that all is well with the system $1x00$ and that no action is required. Moreover, the "normal" fault descriptor $2x07$ (and other fault descriptor $2x07$ deemed insufficiently serious) can be set so that no action is taken in response thereto, including sending no message to the status recipient $1x40$.

In a preferred embodiment, the selected techniques or values used by the system $1x00$ can be included in a configuration database $1x32$ associated with the status monitor $1x30$ and alterable by the system administrator $2x12$ or other operator. The configuration database $1x32$ can include one or more of, or any combination of, any of the following:

The technique(s) used by each data interface $1x20$ to reformat the data from the data sources $1x10$. For example, data interfaces $1x20$ disposed for receiving SNMP messages can be configured to recognize and extract data from those messages. Data interfaces $1x20$ disposed for receiving email or other text can be configured to recognize text in response to selected keywords and to asses that text in response thereto.

The technique(s) used by each input port $2x10$ to determine trends.

Known associations between selected bit vector patterns and selected faults or other events.

In a preferred embodiment, the configuration database $1x32$ can include a set of possible anomalies that might be associated with the functional status of the device $1x11$ and an set of associations between those anomalies and a set of selected fault conditions.

Method of Operation

Figure 3:
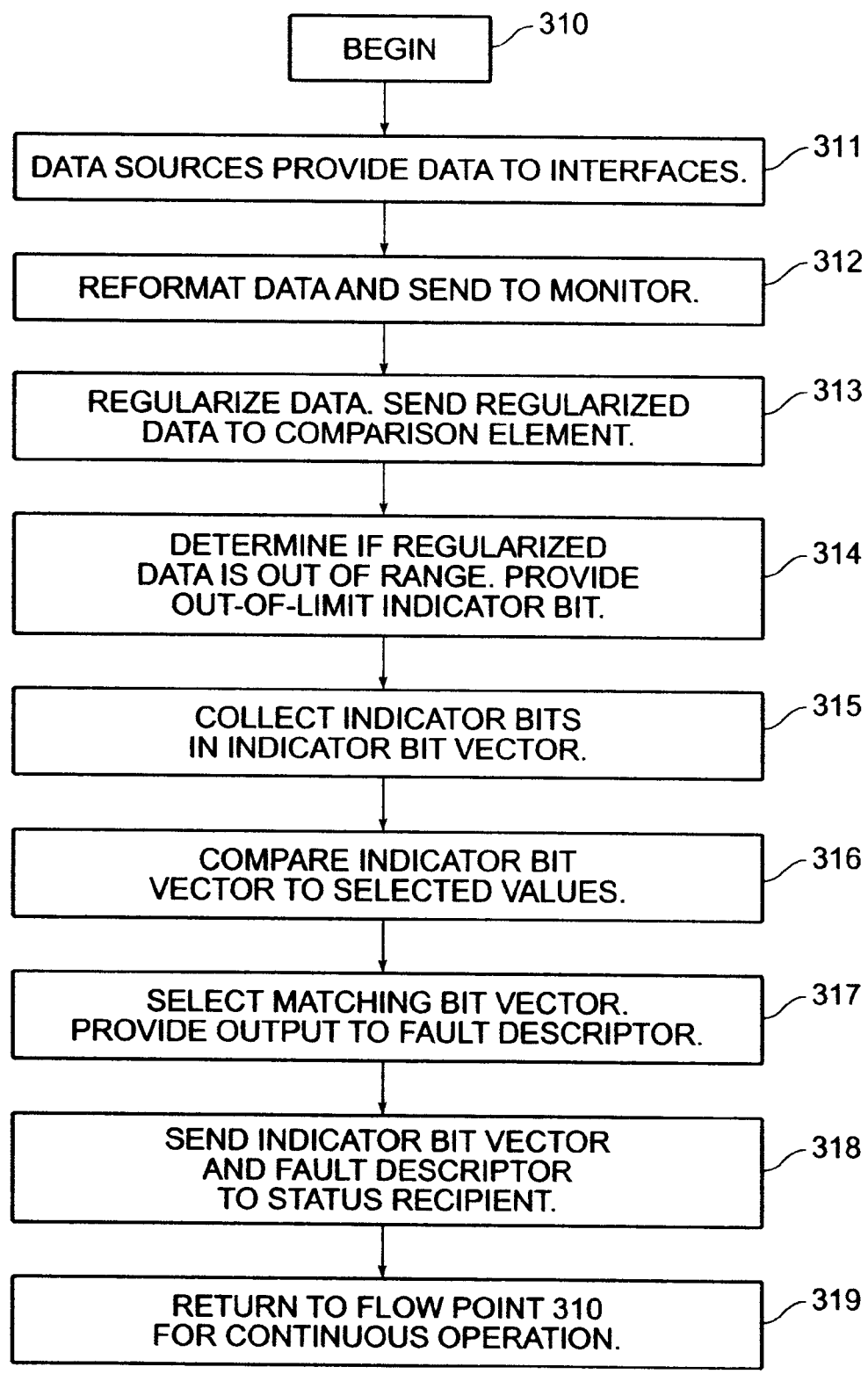
FIG. 3 shows a process flow diagram of a method of operation for a status monitor for adaptively monitoring status information from multiple sources.

FIG. 3 shows a process flow diagram of a method of operation for a status monitor for adaptively monitoring status information from multiple sources.

A method $3x00$ is performed by the system $1x00$ operating in conjunction, including the data sources $1x10$, data interfaces $1x20$, and the status monitor $1x30$.

At a flow point $3x10$, the system $1x00$ is in operation and the method $3x00$ is being continuously performed.

At a step $3x11$, the data sources $1x10$ provide data to the data interfaces $1x20$. In a preferred embodiment, the data sources $1x10$ provide data by sending messages to the data interfaces $1x20$ in known formats, as described above.

At a step $3x12$, each data interface $1x20$ can receive data from its corresponding data source $1x10$. For each data interface $1x20$ that receives data, the data interface $1x20$ (a) receives the data, (b) reformats the data if necessary into a the format usable by the status monitor $1x30$, and (c) sends the reformatted data to the status monitor $1x30$ in that usable format.

At a step $3x13$, the input ports $2x10$ of the status monitor $1x30$ can each receive a set of values for raw data $2x01$. For each input port $2x10$ that receives raw data $2x01$, the input port $2x10$ (a) receives the raw data $2x01$, (b) processes the raw data $2x01$ to provide regularized data $2x02$, and (c) sends the regularized data $2x02$ to its corresponding comparison element $2x20$ in the status monitor $1x30$.

As part of this step, each input port $2x10$ that receives raw data $2x01$ can determine a trend for that raw data $2x01$, as described above.

At a step $3x14$, the comparison elements $2x20$ in the status monitor $1x30$ can each receive a set of values for the regularized data $2x02$. For each comparison element $2x20$ that receives regularized data $2x02$, the comparison element $2x20$ (a) receives the regularized data $2x02$, and (b) processes the regularized data $2x02$ to determine if the received values for the regularized data $2x02$ are outside of a selected limit range, as described above. In response to this processing, the comparison element $2x20$ provides a corresponding out-of-limit indicator bit $2x05$ indicating whether or not the regularized data $2x02$ is within the selected limit range.

At a step $3x15$, the indicator bits $2x05$ from the comparison elements $2x20$ are collected into an indicator bit vector $2x06$. The indicator bit vector $2x06$ is coupled to a bit vector comparator $2x30$.

At a step $3x16$, the bit vector comparator $2x30$ receives the indicator bit vector $2x06$ and compares it against the selected bit vectors $2x06$ in the bit vector memory $2x31$.

At a step $3x17$, in response to the comparison in the previous step, the bit vector comparator $2x30$ selects one or more matching selected bit vectors $2x06$ and provides, in response to fault descriptors $2x07$ associated with those matching selected bit vectors $2x06$, one or more outputs. In a preferred embodiment, the bit vector comparator $2x30$ selects one "best match" among the selected bit vectors $2x06$ in the bit vector memory $2x31$ for the indicator bit vector $2x06$, and provides one output in response to the corresponding fault descriptor $2x07$, as described above.

At a step $3x18$, in response to the fault descriptors $2x07$ determined in the previous step, the bit vector comparator $2x30$ sends the indicator bit vector $2x06$ and the corresponding fault descriptor $2x07$ to the status recipient $1x40$, and takes other appropriate action as indicated by the fault descriptor $2x07$.

The method $3x00$ operates continuously, and so returns to the flow point $3x10$.

In a preferred embodiment, the system $1x00$ starts with substantially no information in the bit vector memory $2x31$, and so spends an amount of time in a learning phase. During the learning phase, the status monitor $1x30$ determines that indicator bit vectors 2x06 that do not well match any of the selected bit vectors 2x06 in the bit vector memory 2x31 are new bit vectors 2x06, and adds those new bit vectors 2x06 to the bit vector memory 2x31.

When recognizing a new bit vector 2x06, the status monitor 1x30 can send a message to the status recipient 1x40 requesting information to associate in the fault descriptor 2x07 for that new bit vector 2x06.

When recognizing a new bit vector 2x06, the status monitor 1x30 can also adapatively respond to other information available at the time the new bit vector 2x06 is received, including one or more of, or any combination of, any of the following:

Selected patterns can be associated with keywords or other aspects (such as priority) of email received from selected users.

Selected anomalous patterns can be associated with normal activity. For example, period of low network activity in the absence of other factors may be associated with off-peak hours.

Selected anomalous patterns can be associated with specific defects based upon past history.

or

Selected anomalous patterns can be associated with preset data that is included in the configuration database 1x32.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method including steps for
   receiving monitoring data, wherein said monitoring data is received from and pertains to operation or status of at least one of the following: (i) a hardware element in a computer system or (ii) a software element in a computer system;
   in response to said monitoring data, adaptively and dynamically building a database of known combinations of said monitoring data,
   in response to said monitoring data, adaptively and dynamically building a database of associations between said known combinations and selected monitoring assessments; and
   taking action in response to said selected monitoring assessments.

2. A method as in claim 1, wherein said database includes a non-null initial set of said known combinations.

3. A method as in claim 1, wherein said database includes a null initial set of said known combinations.

4. A method as in claim 1, wherein said database includes at least one said known combination associated with a non-fault monitoring assessment.

5. A method as in claim 1, wherein said monitoring data includes SNMP data or email text.

6. A method as in claim 1, wherein said selected monitoring assessments include at least one of
   diagnostic information of a fault;
   message information for presentation to an operator; or
   remedial action to be taken in response to said selected monitoring assessment.

7. A method as in claim 1, wherein said steps for receiving monitoring data include steps for receiving selected monitoring data having a new data format.

8. A method as in claim 1, wherein said computer system includes a file server.

9. Apparatus including
   a plurality of monitoring data input ports, wherein each said monitoring data input port is (1) coupled to least one of the following: (i) a hardware element in a computer system or (ii) a software element in a computer system, and (2) provides a sequence of monitoring data,
   a plurality of comparison elements, each one coupled to an associated one of said input ports, and each providing a sequence of comparison values;
   a database having a plurality of sets of comparison values, each said set of comparison values having a monitoring assessment associated therewith;
   a vector comparator, coupled to said comparison values for said comparison elements, and coupled to said database, and providing a selected group of said plurality of sets in response thereto; and
   a fault response element, coupled to at least one said monitoring assessment and providing a response thereto.

10. Apparatus as in claim 9, wherein at least one said sequence of monitoring data includes SNMP data or email text.

11. Apparatus as in claim 9, wherein said data input ports each include an element for recognizing monitoring data having a selected data format, whereby said apparatus can receive a new said data input port having a new said data format.

12. Apparatus as in claim 9, wherein said database includes a non-null initial set of said comparison values.

13. Apparatus as in claim 9, wherein said database includes a null initial set of said comparison values.

14. Apparatus as in claim 9, wherein said database includes at least one said known set of comparison values associated with a non-fault monitoring assessment.

15. Apparatus as in claim 9, wherein said selected monitoring assessments include at least one of
   diagnostic information of a fault;
   message information for presentation to an operator; or
   remedial action to be taken in response to said selected monitoring assessment.

16. An apparatus as in claim 9, wherein said computer system includes a file server.

17. A memory storing information, including instructions, the instructions executable by a processor, said instructions including
   receiving monitoring data, wherein said monitoring data is received from and pertains to at least one of the following: (i) a file server; or (ii) a software element in a computer system;
   adaptively and dynamically building a database of known combinations of said monitoring data, wherein said database is coupled to a bit vector comparator;
   in response to said monitoring data, adaptively and dynamically building a database of associations between said known combinations and selected monitoring assessments; and
   taking action in response to said selected monitoring assessments.

18. A memory as in claim 17, wherein said database includes a non-null initial set of said known combinations.

19. A memory as in claim 17, wherein said database includes a null initial set of known combinations.

20. A memory as in claim 17, wherein said database includes at least one said known combination associated with a non-fault monitoring assessment.

21. A memory as in claim 17, wherein said monitoring database includes SNMP data or email text.

22. A memory as in claim 17, wherein said selected monitoring assessments includes at least one of the following: (a) diagnostic information of a fault; (b) message information for presentation to an operator; or (c) remedial action to be taken in response to said selected monitoring assessments.

23. A memory as in claim 17, wherein said steps of receiving monitoring data include steps for receiving selected monitoring data having a new data format.

24. A method including steps of receiving monitoring data, wherein said monitoring data is received from and pertains to at least one of the following: (i) a file server; or (ii) a software element in a computer system;

generating an indicator bit, wherein said indicator bit is responsive to said monitoring data that falls outside a limit;

collecting said indicator bits in a bit vector comparator, in response to said indicator bits, adaptively and dynamically building a database of known combinations of said monitoring data, wherein said database is coupled to a bit vector comparator;

in response to said monitoring data, adaptively and dynamically building a database of associations between said known combinations and selected monitoring assessments; and taking action in response to said selected monitoring assessments.

25. A method as in claim 24, wherein said database includes a non-null initial set of said known combinations.

26. A method as in claim 24, wherein said database includes a null initial set of said known combinations.

27. A method as in claim 24, wherein said database includes at least one said known combination associated with a non-fault monitoring assessment.

28. A method as in claim 24, wherein said monitoring data includes SNMP data or email text.

29. A method as in claim 24 wherein said selected monitoring assessments include at least one of diagnostic information of a fault;

message information for presentation to an operator; or remedial action to be taken in response to said selected monitoring assessments.

30. A method as in claim 24, wherein said steps of receiving monitoring data include steps of receiving selected monitoring data having a new data format.

31. Apparatus including a plurality of monitoring data input ports, wherein each said monitoring data input port is (1) coupled to least one of the following: (i) a file server; or (ii) a software element in a computer system, and (2) provides a sequence of monitoring data, a plurality of comparison elements, each one coupled to an associated one of said input ports, and each providing an indicator bit, wherein said indicator bit indicates whether said sequence of monitoring data is within a stated range;

a plurality of indicator bit vectors, wherein said each indicator bit vector collects said indicator bits generated from said sequence of monitoring data;

a bit vector comparator coupled to said comparison element wherein said bit vector comparator includes a database having a plurality of sets of comparison values, each said set of comparison values having a monitoring assessment associated therewith; and a fault response element, coupled to at least one said monitoring assessment and providing a response thereto.

32. An apparatus as in claim 31, wherein said sequence of monitoring data includes SNMP data or email text.

33. An apparatus as in claim 31, wherein said data input ports each include an element for recognizing monitoring data having a selected data format, whereby said apparatus can receive a new said data input port having a new said data format.

34. An apparatus as in claim 31, wherein said database includes a non-null initial set of comparison values.

35. An apparatus as in claim 31, wherein said database includes a null initial set of comparison values.

36. An apparatus as in claim 31, wherein said database includes at least one said known set of comparison values associated with a non-fault monitoring assessment.

37. An apparatus as in claim 31, wherein said selected monitoring assessments includes at least one of diagnostic information of a fault;

message information for presentation to an operator; or remedial action to be taken in response to said selected monitoring assessment.

* * * * *